(12) United States Patent
Zhang et al.

(10) Patent No.: US 11,947,224 B1
(45) Date of Patent: Apr. 2, 2024

(54) DISPLAY PANEL AND DISPLAY DEVICE

(71) Applicant: HKC CORPORATION LIMITED, Guangdong (CN)

(72) Inventors: Jianying Zhang, Guangdong (CN); Baohong Kang, Guangdong (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/334,940

(22) Filed: Jun. 14, 2023

(30) Foreign Application Priority Data

Dec. 8, 2022 (CN) .......................... 202211572678.8

(51) Int. Cl.
*G02F 1/1339* (2006.01)
*G02F 1/1333* (2006.01)

(52) U.S. Cl.
CPC ...... *G02F 1/1339* (2013.01); *G02F 1/133314* (2021.01)

(58) Field of Classification Search
CPC .......................... G02F 1/1339; G02F 1/133314
See application file for complete search history.

(56) References Cited

U.S. PATENT DOCUMENTS

| 2014/0319998 | A1* | 10/2014 | Han | ...................... | H10K 50/84 |
| | | | | | 313/504 |
| 2015/0099259 | A1* | 4/2015 | Franco | ...................... | G09F 7/00 |
| | | | | | 29/401.1 |
| 2016/0041413 | A1* | 2/2016 | Nishino | ................. | G02F 1/1368 |
| | | | | | 349/42 |
| 2016/0091748 | A1* | 3/2016 | Kuk | .................. | G02F 1/133308 |
| | | | | | 445/24 |

FOREIGN PATENT DOCUMENTS

| CN | H055893 | A | | 1/1993 |
| CN | 1564961 | A | | 1/2005 |
| CN | 2005084324 | A | | 3/2005 |
| CN | 102566152 | A | | 7/2012 |
| CN | 103869526 | A | * | 6/2014 |
| CN | 103869526 | A | | 6/2014 |
| CN | 104597668 | A | | 5/2015 |

OTHER PUBLICATIONS

The first office action issued in corresponding CN application No. 202211572678.8 dated Jan. 30, 2023.

* cited by examiner

*Primary Examiner* — Paisley L Wilson
*Assistant Examiner* — Agnes Dobrowolski
(74) *Attorney, Agent, or Firm* — HAUPTMAN HAM, LLP

(57) ABSTRACT

A display panel is provided. The display panel includes a display region and a non-display region surrounding a periphery of the display region. The non-display region includes a multiple corner regions and multiple linear regions. The display panel further includes a first substrate, a second substrate, a liquid crystal layer, and a bezel assembly. The bezel assembly includes multiple support members and multiple sealant. At least one of the multiple support members is disposed in the corner region and the sealant is disposed in the linear region. The support member and the sealant bonds the first substrate and the second substrate. Two opposite ends of the sealant are respectively connected with one of the support members in two corner regions, and the liquid crystal layer is sealed between the first substrate and the second substrate. A display device having the display panel is also provided.

12 Claims, 5 Drawing Sheets

DISPLAY PANEL AND DISPLAY DEVICE

CROSS-REFERENCE TO RELATED APPLICATION(S)

This application claims priority to and the benefit of Chinese Application No. 202211572678.8, filed Dec. 8, 2022, the entire disclosure of which is hereby incorporated by reference.

TECHNICAL FIELD

This application relates to the field of display technology, in particular to a display panel and a display device having the display panel.

BACKGROUND

Liquid crystal displays occupy more and more important positions in people's life and work, and have advantages such as thin machine body, low power consumption, and low price, and thus are widely used. The liquid crystal display generally includes a liquid crystal display panel and a backlight module, where the liquid crystal display panel includes a color filter substrate, an array substrate, and a liquid crystal layer arranged between the color film substrate and the array substrate.

The liquid crystal display panel generally further includes a sealant, and the sealant bonds the color filter substrate and the array substrate together and seals the liquid crystal layer, where the sealant is formed by a coating process. However, when the sealant is applied to a turning position, the speed of coating cannot be accurately controlled, and if the coating speed is too fast, the sealant is likely to be broken, so that the liquid crystal layer cannot be sealed, thereby causing abnormal display of the display panel; if the coating speed is too slow, the sealant is too wide, so that the size at the edge of the display panel is widened, and thus a narrow bezel cannot be achieved.

Therefore, how to solve the problem of easy breaking of the sealant and excessive width of the sealant at the turning position is urgent to be solved by a person skilled in the art.

SUMMARY

Embodiments of the disclosure provide a display panel. The display panel includes a display region and a non-display region surrounding a periphery of the display region, where the non-display region includes multiple corner regions and multiple linear regions, and the multiple corner regions and the multiple linear regions are arranged alternately and adjacently. The display panel further includes a first substrate, a second substrate, a liquid crystal layer, and a bezel assembly. The first substrate and the second substrate are opposite to and spaced apart from each other. The liquid crystal layer and the bezel assembly are both disposed between the first substrate and the second substrate, and the bezel assembly being located on a peripheral of the liquid crystal layer. The bezel assembly includes multiple support members and multiple sealant. Each corner region being provides with multiple support members which are connected and arranged side by side. The sealant is disposed in the linear region, and the support members and the sealant bonding the first substrate and the second substrate, two opposite ends of the sealant are respectively connected with one of the support members in two corner regions, and the liquid crystal layer is thus sealed between the first substrate and the second substrate. Two opposite ends of one of the multiple support members in the corner region are connected to the sealant in two liner regions respectively, or, two of the multiple support members in the corner region are connected to the sealant in two liner regions respectively.

In summary, the display panel provided herein includes the display region and the non-display region surrounding the periphery of the display region, the non-display region includes multiple corner regions and multiple linear regions. The display panel further includes the first substrate, the second substrate, the liquid crystal layer, and the bezel assembly. The bezel assembly includes multiple support members and multiple sealant. At least one of the multiple support members is disposed in the corner region, the sealant is disposed in the linear region, and the support member and the sealant bond the first substrate and the second substrate, two opposite ends of the sealant are respectively connected with one of the support members in two corner regions, and the liquid crystal layer is thus sealed between the first substrate and the second substrate. Therefore, by providing the support members in the corner regions to replace the sealant, there is no need to apply the sealant to the corner regions, not only omitting the process of coating the sealant in the corner region, but also preventing the sealant from being coated in the corner region, thereby preventing the sealant from breaking at the corner region due to an excessively fast coating speed and preventing the sealant from broadening at the corner region due to an excessively slow coating speed. Normal display and a narrow bezel design of the display panel are achieved, and the display quality of the display panel is ensured.

Based on the same inventive concept, embodiments of the disclosure provide a display device. The display device includes a backlight module and the display panel described above, the display panel is disposed on a light-emitting side of the backlight module.

BRIEF DESCRIPTION OF THE DRAWINGS

To describe the technical solutions in the embodiments of the disclosure more clearly, the following briefly introduces the accompanying drawings required for describing the embodiments. Apparently, the accompanying drawings in the following description show merely some embodiments of the disclosure, and a person of ordinary skill in the art may still derive other drawings from these accompanying drawings without creative efforts.

DESCRIPTION OF REFERENCE NUMERALS

Figure 1:
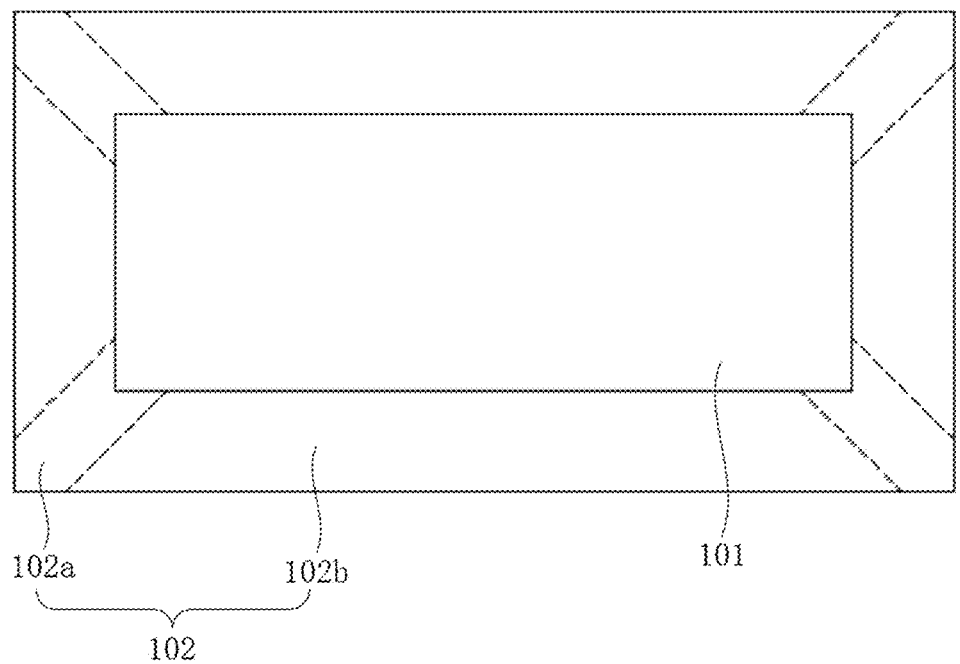
FIG. 1 is a front view illustrating a structure of a display panel according to a first embodiment of the disclosure.

001—first direction; 002—second direction; 100(200)—display panel; 101—display region; 102—non-display region; 102*a*—corner region; 102*b*—liner region; 105—accommodation space; 110—first substrate; 120—second substrate; 140—liquid crystal layer; 141—liquid crystal molecules; 160—bezel assembly; 161(162)—support member; 161*a*—first support member; 161*b*—second support member; 161*c*—third support member; 163—sealant; 163*a*—first sealant; 163*b*—second sealant; 163*c*—third sealant; 163*d*—fourth sealant; 165—connecting member; 167—magnetic element; 168—magnetic particle; 169—hydrophobic layer; 170—spacer; 171—support body; 172—hydrophilic layer; 300—backlight module; 500—display device

DETAILED DESCRIPTION

In order to facilitate understanding of the disclosure, the disclosure will be described more fully hereinafter with reference to the accompanying drawings. Preferred embodiments of the disclosure are shown in the drawings, but the disclosure may be implemented in many different forms and is not limited to the embodiments described herein. Rather, these embodiments are provided so that this disclosure will be thorough and complete.

The following description of the embodiments refers to the accompanying drawings to illustrate specific embodiments of the disclosure. Sequential reference themselves, such as "first", "second", etc., are used merely to distinguish between described objects and do not have any ordinal or technical meaning. However, the expressions "connected" and "coupled" in the disclosure, unless otherwise specified, both include direct connection and indirect connection. Directional terms mentioned in the disclosure, for example, "upper", "lower", "front", "rear", "left", "right", "inner", "outer", "side" and the like are only directions with reference to the accompanying drawings, and therefore, the directional terms are used for better and clearer illustration and understanding of the disclosure, rather than indicate or imply that the indicated device or element must have a particular orientation, be constructed and operated in a particular orientation, therefore, it cannot be understood that the disclosure is limited thereto.

In the description of the disclosure, it should be noted that, unless specified or limited otherwise, the terms "mounted", "connected with", and "connected to" should be understood broadly, for example, may be fixedly connected, may also be detachably connected, or may be integrally connected; may also be mechanical connections; may also be direct connections or indirect connections via intervening structures; and may also be inner communications of two elements. The specific meanings of the above terms in the disclosure can be understood by those skilled in the art according to specific situations. It should be noted that terms such as "first" and "second" in the description and claims and drawings of the disclosure are used for distinguishing different objects, rather than for describing a specific sequence.

In addition, as used herein, the term "include", "may include", "contain" or "may contain" indicates the existence of a corresponding disclosed function, operation, element, etc., and does not exclude one or more other functions, operations, elements, etc. In addition, the terms "comprise" or "include" means that there are corresponding features, numbers, steps, operations, elements, components, or a combination thereof disclosed in the specification, and do not exclude the presence or addition of one or more other features, numbers, steps, operations, elements, components, or a combination thereof, and are intended to cover a non-exclusive inclusion. It should also be understood that the meaning of "at least one" used herein refers to one or more, such as one, two, or three, etc., while the meaning of "multiple" refers to at least two, such as two or three, etc., unless otherwise specifically defined.

Unless defined otherwise, all technical and scientific terms used herein have the same meaning as commonly understood by one of ordinary skill in the art to which this application belongs. The terminology used herein in the description of the disclosure is for the purpose of describing particular embodiments only and is not intended to be limiting of the disclosure.

In view of the described deficiencies of the prior art, the present disclosure provides a display panel and a display device having the display panel, which are intended to solve the problem that the sealant is likely to be broken and is too wide at a corner in the prior art.

The display panel includes a display region and a non-display region surrounding a periphery of the display region, where the non-display region includes multiple corner regions and multiple linear regions, and the multiple corner regions and the multiple linear regions are arranged alternately and adjacently. The display panel further includes a first substrate, a second substrate, a liquid crystal layer, and a bezel assembly. The first substrate and the second substrate are opposite to and spaced apart from each other. The liquid crystal layer and the bezel assembly are both disposed between the first substrate and the second substrate, and the bezel assembly being located on a peripheral of the liquid crystal layer. The bezel assembly includes multiple support members and multiple sealant. Each corner region being provides with multiple support members which are connected and arranged side by side. The sealant is disposed in the linear region, and the support members and the sealant bonding the first substrate and the second substrate, two opposite ends of the sealant are respectively connected with one of the support members in two corner regions, and the liquid crystal layer is thus sealed between the first substrate and the second substrate. Two opposite ends of one of the multiple support members in the corner region are connected to the sealant in two liner regions respectively, or, two of the multiple support members in the corner region are connected to the sealant in two liner regions respectively In exemplary embodiments, one of the support members is disposed in one of the corner regions, and the multiple support members and the multiple sealant are disposed alternately end-to-end.

In exemplary embodiments, where the multiple support members are disposed side by side in one of the corner regions, two opposite ends of one of the multiple support members in the corner region are connected with the sealant in two liner regions respectively; or two of the multiple support members in the corner region are connected with the sealant in two liner regions respectively.

In exemplary embodiments, the support member is provided with multiple magnetic elements, the sealant is provided with multiple magnetic particles, and the sealant moves towards the support member under an action of a magnetic force between the magnetic elements and the magnetic particles.

In exemplary embodiments, the bezel assembly further comprises multiple hydrophobic layers, and the sealant covers the hydrophobic layers on the first substrate and/or the second substrate.

In exemplary embodiments, the hydrophobic layer is made fluoropolyethylenes, fluorocarbon waxes, polycarbonates, or polyamides.

In exemplary embodiments, the support member is formed on the first substrate, and a width and/or a length of the support member decreases in a direction away from the first substrate, or the support member is formed on the second substrate, and the width and/or the length of the support member decreases in a direction away from the second substrate.

In exemplary embodiments, the support member comprises a support body and two hydrophilic layers, and the two hydrophilic layers are disposed respectively at two ends of the support body facing the sealant adjacent to the support body.

In exemplary embodiments, the hydrophilic layer is made of sodium silicate, sodium tetraborate decahydrate, sodium hexasiliconate calcium oxide hydrate, or sodium carbonate decahydrate.

Please refer to FIG. 1, FIG. 1 is a front view illustrating a structure of a display panel according to a first embodiment of the present disclosure. The display panel 100 provided in embodiments of the disclosure includes a display region 101 and a non-display region 102 surrounding a peripheral of the display region 101. The non-display region 102 includes multiple corner regions 102a and multiple liner regions 102b, where the multiple corner regions 102a and the multiple liner regions 102b are arranged alternately and adjacently in sequence. That is, the liner region 102b is located between adjacent corner regions 102a, and the corner region 102a is located between adjacent liner regions 102b.

In exemplary embodiments, a planar shape of the display panel 100 may be a rectangle, the number of the corner regions 102a is four, and the number of the liner regions 102b is four either. The number of the corner regions 102a and the number of the liner regions 102b may be determined by the planar shape of the display panel 100, which is not specifically limited in the disclosure.

Figure 2:
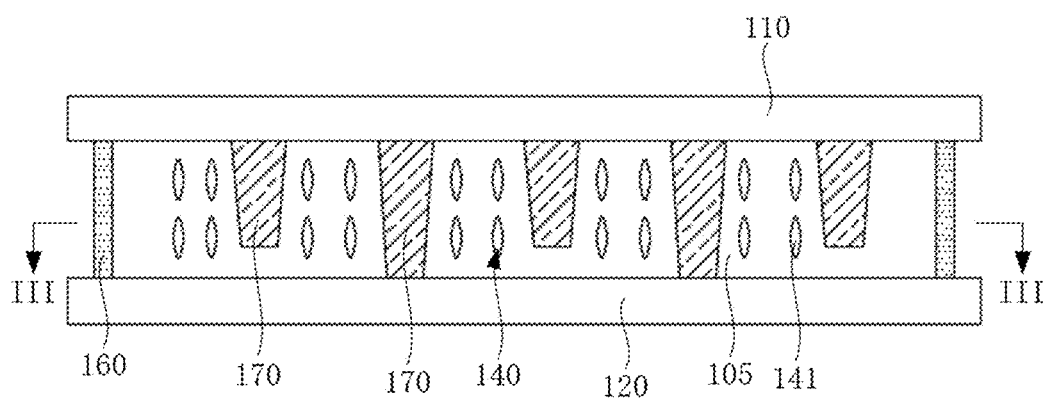
FIG. 2 is a schematic diagram of a first layer structure of the display panel disclosed in the first embodiment of the disclosure.

In embodiments of the disclosure, referring to FIG. 2, FIG. 2 is a schematic diagram of a first layer structure of the display panel disclosed in the first embodiment of the disclosure. The display panel 100 may include at least a first substrate 110, a second substrate 120, a liquid crystal layer 140, and a bezel assembly 160. The first substrate 110 and the second substrate 120 are opposite to and spaced apart from each other. The liquid crystal layer 140 and the bezel assembly 160 are both disposed between the first substrate 110 and the second substrate 120, and the bezel assembly 160 is located on a peripheral of the liquid crystal layer 140.

In exemplary embodiments, the first substrate 110 may be a color filter substrate, and the second substrate 120 may be an array substrate. Alternatively, the first substrate 110 may be an array substrate, and the second substrate 120 may be a color filter substrate, which is not specifically limited in the disclosure.

In the embodiment of the present disclosure, the bezel assembly 160 may include multiple support members (such as support pillars) and multiple sealant, at least one of the multiple support members is disposed in the corner region, the sealant is disposed in the liner region, and the support member and the sealant are both connected between the first substrate and the second substrate so as to adhere the first substrate and the second substrate. Opposite ends of the sealant are respectively connected with one of the support members in two corner regions to enclose the liquid crystal layer between the first substrate and the second substrate.

Figure 3:
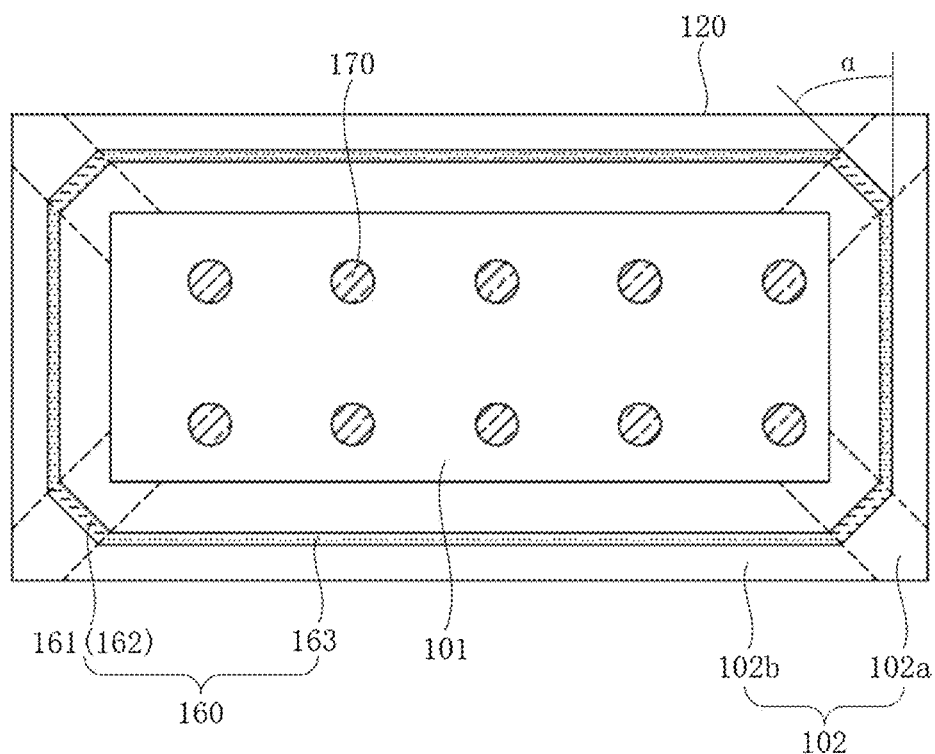
FIG. 3 is a first schematic cross-sectional view of the display panel illustrated in FIG. 2 taken along a direction of III-III.

Please refer to FIG. 3, FIG. 3 is first schematic cross-sectional view of the display panel illustrated in FIG. 2 taken along a direction of III-III. In embodiments of the disclosure, the bezel assembly 160 includes multiple support members 161 and multiple sealant 163. One of the multiple support members 161 is disposed in the corner region 102a, and the sealant 163 is disposed in the liner region 102b. The support members 161 and the sealant 163 are both connected between the first substrate 110 and the second substrate 120, so as to bond the first substrate 110 and the second substrate 120. Two opposite ends of the sealant 163 are connected to two support members 161, respectively, so as to enclose the liquid crystal layer 140 between the first substrate 110 and the second substrate 120.

It can be understood that, the support members 161 rather than the sealant are provided in the corner regions 102a, and the sealant 163 is not required to be coated in the corner regions 102a. Not only the process of coating the sealant in the corner region is omitted, but also the problem that the sealant 163 is disconnected or broken in the corner region 102a due to too fast coating speed and the problem that the sealant 163 is too wide in the corner region 102a due to too slow coating speed can be avoided.

In exemplary embodiments, one sealant 163 is disposed in one first liner region 102b.

In exemplary embodiments, referring to FIG. 2, the display panel 100 further includes multiple spacers 170, which are disposed between the first substrate 110 and the second substrate 120 and inside the bezel assembly 160. The multiple spacers 170, the first substrate 110 and the second substrate 120 enclose to form multiple accommodation spaces 105. The liquid crystal layer 140 includes multiple liquid crystal molecules 141, and the multiple liquid crystal molecules 141 are located in the accommodation space 105.

In exemplary embodiments, the multiple spacers 170 are located in the display region 101, so as to support the first substrate 110 and the second substrate 120 in the display region 101.

In exemplary embodiments, an orthographic projection of the support member 161 on the second substrate 120 may be a rectangle, a trapezoid, a sector, or other shapes, which is not specifically limited in the disclosure.

In exemplary embodiments, the support member 161 can be made of the same material as an insulating layer on the array substrate, that is, the support member 161 can be made of silicon oxide or silicon nitride. Or, the support member 161 can be made of the same material as the spacer 170, that is, the support member 161 may be made of a photoresist material, which is not specifically limited in the disclosure.

In exemplary embodiments, an angle α between the support member 161 and the sealant 163 may be 30 degrees to 60 degrees, for example, 30 degrees, 32 degrees, 37 degrees, 40 degrees, 45 degrees, 50 degrees, 54 degrees, 60 degrees, or any other value, which is not specifically limited in the disclosure, where a is an angle between an extension line of the support member 161 and an extension line of the sealant 163.

In exemplary embodiments, a distance between two ends of the support member 161 connected to the sealant 163 (namely, a length of the support member 161) is greater than or equal to 20 μm, for example, 20 μm, 30 μm, 50 μm, 100 μm, 140 μm, 200 μm, or any other value, which is not specifically limited in the present disclosure. A distance between two sides of the support member 161 facing the display region 101 and facing away from the display region 101 (namely, a width of the support member 161) is greater than or equal to 10 μm, for example, 10 μm, 20 μm, 40 μm, 70 μm, 100 μm, or any other value, which is not specifically limited in the present disclosure. A distance between two sides of the support member 161 facing the first substrate 110 and facing the second substrate 120 (namely, a thickness of the support member 161) is 1 μm to 5 μm, for example, 1 μm, 1.5 μm, 2 μm, 2.5 μm, 4 μm, 5 μm, or any other value, which is not specifically limited in the present disclosure. It should be understood that, the length and the width of the support member 161 may be determined by the size of the display panel 100.

In summary, the display panel 100 provided herein includes the display region 101 and the non-display region 102 surrounding the periphery of the display region 101. The non-display region 102 includes multiple corner regions 102a and multiple linear regions 102b. The multiple corner regions 102a and the multiple liner regions 102b are arranged alternately and adjacently in sequence. The display panel 100 further includes the first substrate 110, the second substrate 120, the liquid crystal layer 140, and the bezel assembly 160. The first substrate 110 and the second substrate 120 are opposite to and spaced apart from each other. The liquid crystal layer 140 and the bezel assembly 160 are both disposed between the first substrate 110 and the second substrate 120, and the bezel assembly 160 is located on a peripheral of the liquid crystal layer 140. The bezel assembly 160 includes multiple support members 161 and multiple sealant 163. At least one of the multiple support members 161 is disposed in the corner region 102a, the sealant 163 is disposed in the linear region 102b, and the support members 161 and the sealant 163 are both connected between the first substrate 110 and the second substrate 120 to bond the first substrate 110 and the second substrate 120. Two opposite ends of the sealant 130 are respectively connected with one support member 161 in each of two corner regions 120a, and the liquid crystal layer 140 is thus sealed between the first substrate 110 and the second substrate 120. Therefore, by providing the support members 161 in the corner regions 102a to replace the sealant, there is no need to coat the sealant 163 in the corner regions 102a, not only omitting the process of coating the sealant in the corner region, but also preventing the sealant 163 from being coated in the corner region 120a, thereby preventing the sealant 163 from breaking at the corner region 102a due to an excessively fast coating speed and preventing the sealant 163 from broadening at the corner region 102a due to an excessively slow coating speed. Normal display and a narrow bezel design of the display panel 100 are achieved, and the display quality of the display panel 100 is ensured.

In the embodiment of the present disclosure, referring to FIG. 3, one support member 161 is disposed in one corner zone 102a, and the multiple support members 161 and the multiple border sealants 163 are disposed alternately in sequence and connected end-to-end. That is, two opposite ends of one support member 161 are connected to two sealant 163 respectively, and two opposite ends of one sealant 163 are connected to two support members 161 respectively.

Figure 4:
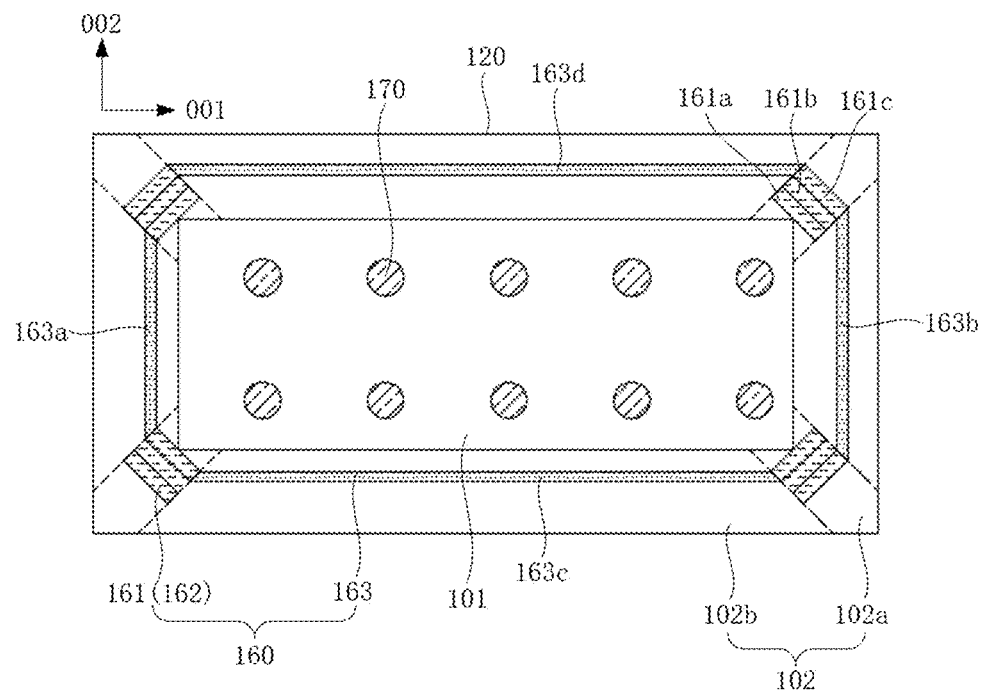
FIG. 4 is a second schematic cross-sectional view of the display panel illustrated in FIG. 2 taken along III-III direction.

Please refer to FIG. 4, FIG. 4 is a second schematic cross-sectional view of the display panel illustrated in FIG. 2 taken along III-III direction. The display panel of the second section differs from the display panel of the first section in that there are multiple support members 161 in each corner region 102a.

In embodiments of the disclosure, multiple support members 161 are disposed side by side in one corner region 102a, two opposite ends of one of the multiple support members 161 in the corner region 102a are connected to the sealant 163 in two liner regions 102b respectively. Or, two of the multiple support members 161 in the corner region 102a are connected with the sealant 163 in two liner regions 102b respectively.

In exemplary embodiments, the multiple support members 161 in one corner region 102a are disposed side by side and connected. When two support members 161 in one corner region 102a are connected with the sealant 163 in two adjacent liner regions 102b respectively, it is possible to avoid a gap between the two support members 161 as the gap may lead to a failure in sealing the liquid crystal layer 140.

It should be understood that, the support member 161 and the sealant 163 can be formed or coated on different substrates. That is, the support member 161 is formed on the first substrate 110 and the sealant 163 is coated on the second substrate 120, or the sealant 163 is coated on the first substrate 110 and the support member 161 is formed on the second substrate 120. When assembling the first substrate 110 and the second substrate 120 to form the display panel 100, sometimes, the sealant 163 cannot come into contact with the support members 161 and thus cannot be connected to the support members 161 due to misalignment between the first substrate 110 and the second substrate 120. By providing multiple support members 161 in one corner region 102a, even if there is a slight misalignment between the first substrate 110 and the second substrate 120, the sealant 163 may still be in contact with and connected to one of the multiple support members 161 in the corner region 102a.

It is also understandable that assembling the first substrate 110 and the second substrate 120 refers to a process of aligning the first substrate 110 and the second substrate 120 in a vacuum environment and bonding the first substrate 110 and the second substrate 120 together by the support members 161 and the sealant 163. The support members 161 are tightly pressed between the first substrate 110 and the second substrate 120 under the action of a pressure difference. After the sealant 163 bonds the first substrate 110 and the second substrate 120 together, the sealant 163 needs to be cured, and the sealant 163 before being cured may flow.

In exemplary embodiments, the number of the support members 161 in one corner region 102a may be 2 to 10, for example, 2, 3, 5, 8, 10, or other number, which is not specifically limited in the present disclosure.

For ease of understanding, referring to FIG. 4, in embodiments of the disclosure, for example, the number of the support members 161 in one corner region 102a is three. For example, the multiple support members 161 includes multiple first support members 161a, multiple second support members 161b, and multiple third support members 161c. One first support member 161a, one second support member 161b, and one third support member 161c are disposed in one corner region 102a, and the first support member 161a is disposed closer to the display region 101 than the second support member 161b. The third support member 161c is disposed on a side of the second support member 161b facing away from the first support member 161a. That is, the second support member 161b is located between the first support member 161a and the third support member 161c. That is, the multiple first support members 161a are disposed at an inner side of the multiple second support members 161b, and the multiple third support members 161c are disposed at an outer side of the multiple third support members 161c. The multiple sealant 163 includes a first sealant 163a, a second sealant 163b, a third sealant 163c, and a fourth sealant 163d located in different liner regions 102b. The first sealant 163a and the second sealant 163b are disposed opposite to each other and are arranged along a first direction 001. The third sealant 163c and the fourth sealant 163d are disposed opposite to each other and are arranged along a second direction 002. The first direction 001 is perpendicular to the second direction 002.

Specifically, if the first substrate 110 and the second substrate 120 are aligned accurately, two opposite ends of each of the first sealant 163a, the second sealant 163b, the third sealant 163c, and the fourth sealant 163d are connected to the second support member 161b. If misalignment occurs between the first substrate 110 and the second substrate 120 in the first direction 001, two opposite ends of the first sealant 163a are connected to two first support members 161a, respectively, and two opposite ends of the second sealant 163b are connected to two third support members 161c, respectively. Alternatively, two opposite ends of the first sealant 163a are connected to the two third support members 161c respectively, and two opposite ends of the second sealant 163b are connected to the two first support members 161a respectively. If misalignment occurs between the first substrate 110 and the second substrate 120 in the second direction 002, two opposite ends of the third sealant 163c are connected to the two first support members 161a respectively, and two opposite ends of the fourth sealant 163d are connected to the two third support members 161c respectively. Alternatively, two opposite ends of the third sealant 163c are connected to the two third support members 161c respectively, and two opposite ends of the fourth sealant 163d are connected to the two first support members 161a respectively.

Figure 5:
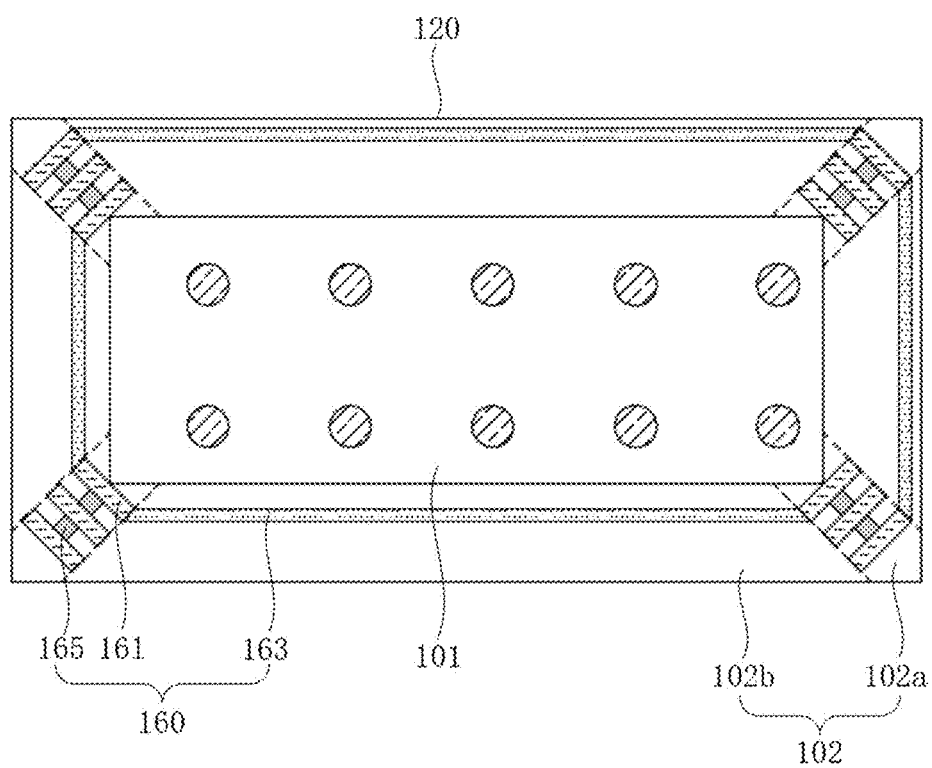
FIG. 5 is a third schematic cross-sectional view of the display panel illustrated in FIG. 2 taken along III-III direction.

In exemplary embodiments, referring to FIG. 5, FIG. 5 is a third schematic cross-sectional view of the display panel illustrated in FIG. 2 taken along III-III direction. The display panel of the third cross section is different from the display panel of the second cross section in that multiple support members 161 in each corner region 102a are arranged side by side and spaced apart from each other.

In embodiments of the disclosure, the multiple support members 161 in the corner region 102a may be arranged at intervals. Further, the bezel assembly 160 further comprises multiple connecting members 165. The connecting member 165 is connected between two adjacent support members 161 in one corner region 102a. In other words, any two adjacent support members 161 are spaced from each other by the connecting member 165, thereby avoid a gap(s) between the multiple support members 161 in one corner region 102a as the gap may result in that the liquid crystal layer 140 cannot be sealed.

In exemplary embodiments, lengths of the multiple support members 161 in one corner region 102a may be the same or different, which is not specifically limited in the present disclosure.

In exemplary embodiments, adjacent support members 161 may be spaced apart by at least 10 um, such as 10 um, 12 um, 20 um, 27 um, 30 um, 35 um, 40 um, or other values, which is not specifically limited in the present disclosure.

Figure 6:
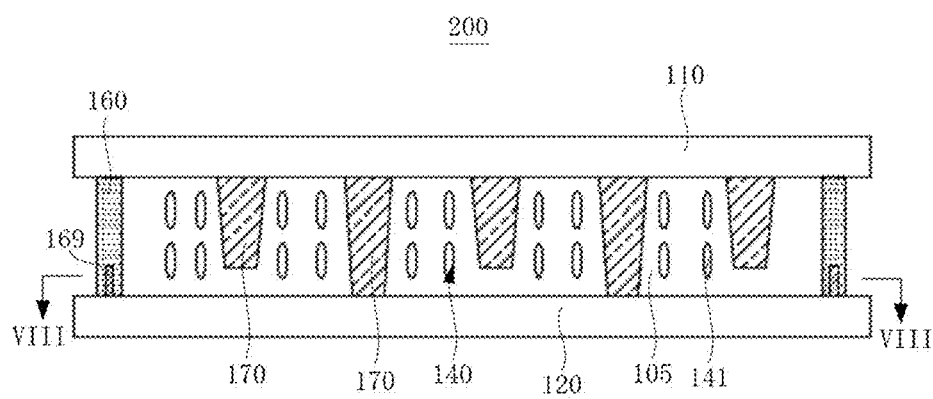
FIG. 6 is a schematic diagram illustrating a second layer structure of the display panel according to the first embodiment of the disclosure.
Figure 7:
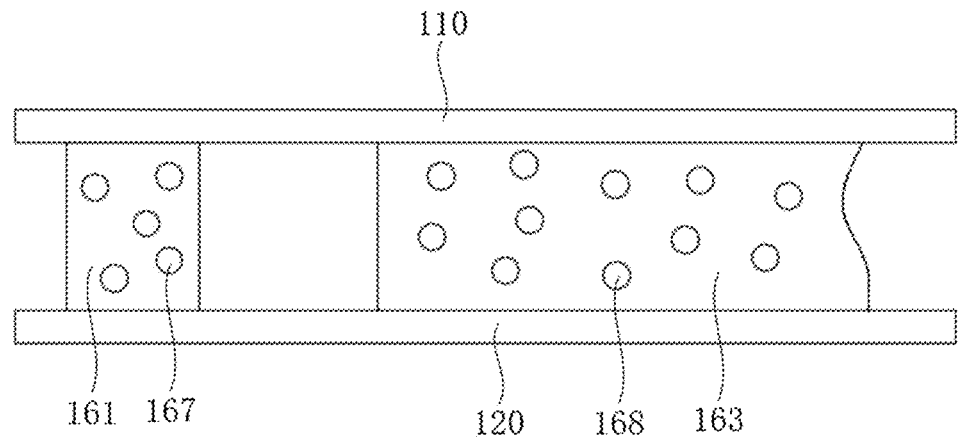
FIG. 7 is a schematic diagram illustrating the connection principle of the support member and the sealant illustrated in FIG. 6.

In the embodiment of the present disclosure, please refer to FIG. 6 and FIG. 7 together, FIG. 6 is a schematic diagram illustrating a second layer structure of the display panel according to the first embodiment of the present disclosure, and FIG. 7 is a schematic diagram illustrating the connection principle between the support member and the sealant illustrated in FIG. 6. In the display panel 200 with the second layer structure, multiple magnetic elements 167 are disposed in the support members 161, multiple magnetic particles 168 are disposed in the sealant 163, and the sealant 163 moves towards the support members 161 under the action of the magnetic force between the magnetic elements 167 and the magnetic particles 168.

In exemplary embodiments, the magnetic element 167 may be a permanent magnet, and the magnetic particles 168 are magnetized under the magnetic field of the magnetic element 167, and generate a magnetic force with the magnetic element 167.

It can be understood that, the support members 161 and the sealant 163 may be formed or coated on different substrates, and when misalignment occurs between the first substrate 110 and the second substrate 120, the sealant 163 cannot be connected to the support members 161. Therefore, the support members 161 are provided with the magnetic elements 167 and the sealant 163 are provided with the magnetic particles 168, even if there is a slight misalignment between the first substrate 110 and the second substrate 120 and a gap exists between the support member 161 and the sealant 163, the sealant 163 can still be in contact with and connected to the support members 161 through the magnetic force between the magnetic elements 167 and the magnetic particles 168.

In exemplary embodiments, the magnetic element 167 can be made of neodymium iron boron, samarium cobalt, aluminum nickel cobalt, iron nickel cobalt, barium ferrite, strontium ferrite, or the like, which is not specifically limited in the disclosure.

In exemplary embodiments, the magnetic element 167 may be spherical in shape, so as to be more uniformly mixed with the material of which the support member 161 is made. The diameter of the magnetic element 167 may be 1 um to 5 um, for example, 1 um, 2 um, 2.5 um, 3 um, 3.2 um, 4 um, 4.4 um, 4.7 um, 5 um, or other values, which is not specifically limited in the disclosure.

In exemplary embodiments, a mass ratio of the magnetic element 167 to the support member 161 may be 1/100 to 1/50, for example, 1/100, 1/90, 1/75, 1/70, 1/67, 1/62, 1/54, 1/50, or other values, which is not limited in the disclosure.

In exemplary embodiments, the magnetic particles 168 may be made of any one of iron, cobalt, nickel, gold, copper, an iron alloy, and the like, which is not specifically limited in the disclosure.

In exemplary embodiments, the magnetic particles 168 may be spherical in shape such that the magnetic particles 168 are more uniformly mixed with the material of which the sealant 163 is made. The diameter of the magnetic particles 168 may be 1 um to 5 um, for example, 1 um, 1.4 um, 2 um, 2.5 um, 3.2 um, 3.8 um, 4.2 um, 4.8 um, 5 um, or other values, which is not specifically limited in the disclosure.

In exemplary embodiments, a mass ratio of the magnetic particles 168 to the sealant 163 may be 1/100 to 1/50, for example, 1/100, 1/90, 1/87, 1/81, 1/74, 1/65, 1/58, 1/50, or other values, which is not limited in the disclosure.

Figure 8:
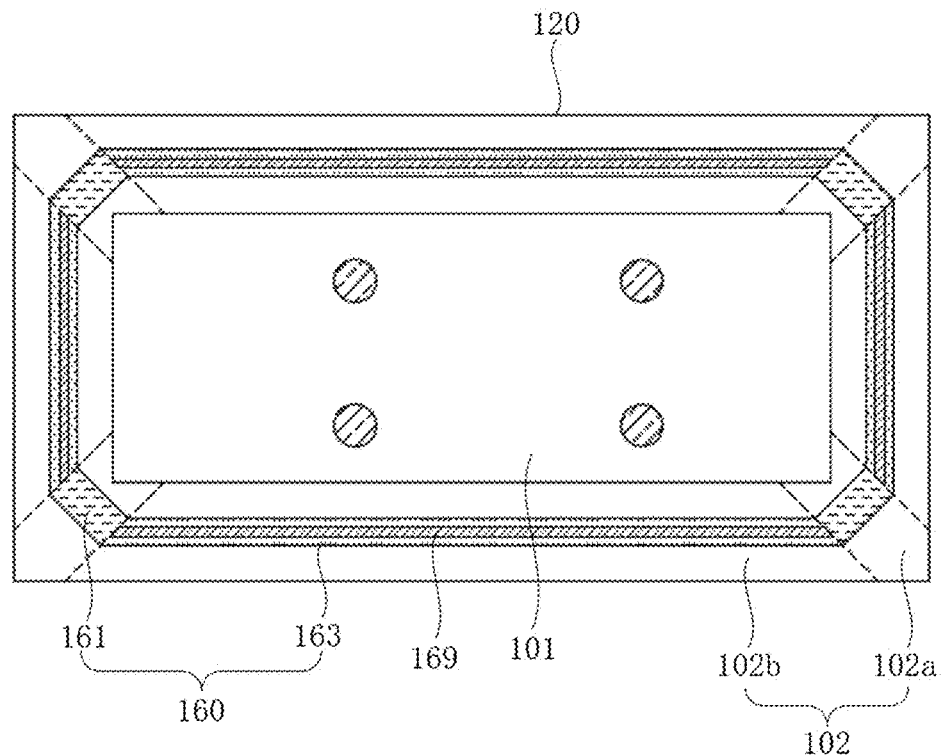
FIG. 8 is a schematic cross-sectional view of the display panel illustrated in FIG. 6 taken along VIII-VIII direction.

Please refer to FIGS. 6 and 8 together, FIG. 8 is a schematic cross-sectional view of the display panel illustrated in FIG. 6 taken along VIII-VIII direction. In embodiments of the disclosure, the bezel assembly 160 further includes multiple hydrophobic layers 169, and the sealant 163 covers the hydrophobic layers 169 on the first substrate 110 and/or the second substrate 120. That is, the hydrophobic layer 169 may be connected to a side of the first substrate 110 facing the second substrate 120 and/or connected to a side of the second substrate 120 facing the first substrate 110, furthermore, located in the linear region 102b. The surface of the hydrophobic layer 169 is covered by the sealant 163 and the first substrate 110, or is covered by the sealant 163 and the second substrate 120, that is, the exposed surface of the hydrophobic layer 169 is covered by the sealant 163.

It can be understood that, when the sealant 163 moves towards the support members 161 under the action of magnetic force, the width of part of the sealant 163 tends to be too narrow, which may result in poor sealing performance of the part or a notch phenomenon. Therefore, the hydrophobic layer 169 is disposed between the first substrate 110 and the sealant 163 and/or between the second substrate 120 and the sealant 163, so as to facilitate the flow of the sealant 163, and prevent part of the sealant 163 from being too narrow in width.

In exemplary embodiments, the hydrophobic layer 169 may be made of fluorinated polyethylene, fluorocarbon wax, polycarbonate, or polyamide, which is not specifically limited in the present disclosure.

In exemplary embodiments, the contact angle of the hydrophobic layer 169 may be 95 degrees to 155 degrees, for example, 95 degrees, 100 degrees, 108 degrees, 120 degrees, 134 degrees, 140 degrees, 150 degrees, 155 degrees, or other values, which is not specifically limited in the disclosure.

In exemplary embodiments, the thickness of the hydrophobic layer 169 may be 0.1 um to 2.4 um, for example, 0.1 um, 0.4 um, 1 um, 1.5 um, 1.8 um, 2 um, 2.4 um, or other values, which is not specifically limited in the disclosure, and the thickness of the hydrophobic layer 169 does not exceed half of the thickness of the sealant 163.

Figure 9:
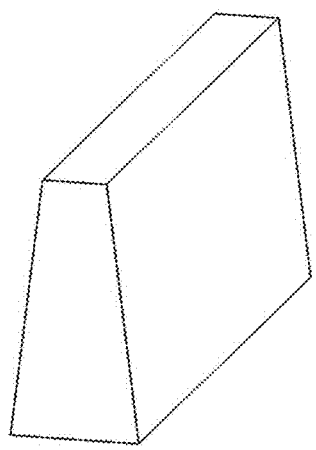
FIG. 9 is a schematic diagram illustrating a first three-dimensional structure of a support member illustrated in FIG. 3.

Please refer to FIG. 9, FIG. 9 is a schematic diagram illustrating a first three-dimensional structural of the support member in FIG. 3. In embodiments of the disclosure, the support member 161 is formed on the first substrate 110, and the width and/or length of the support member 161 decrease in a direction away from the first substrate 110. Alternatively, the support member 161 is formed on the second substrate 120, and the width and/or length of the support member 161 decrease in a direction away from the second substrate 120.

It should be understood that, the support member 161 and the sealant 163 can be formed or coated on different substrates. That is, the support member 161 is formed on the first substrate 110 and the sealant 163 is coated on the second substrate 120, or the sealant 163 is coated on the first substrate 110 and the support member 161 is formed on the second substrate 120. When misalignment occurs between the first substrate 110 and the second substrate 120, the support members 161 interfere with the sealant 163, that is, the orthographic projection of the support member 161 on the first substrate 110 partially overlaps the orthographic projection of the sealant 163 on the first substrate 110. Part of the sealant 163 may be deposited on the support members 161, resulting in a problem that the display panel 100 formed by assembling the support members 161 is warped and has a non-uniform thickness. Therefore, the top of the support member 161 is designed to have a length and/or a width that gradually decreases, which facilitates the flow of the sealant 163 and prevents part of the sealant 163 from being deposited on the support member 161.

In exemplary embodiments, a peripheral surface of the support member 161 may be a slope or an arc surface.

In exemplary embodiments, an overall shape of the support member 161 may be a truncated pyramid shape, a width of a lower base thereof is greater than or equal to 10 um, and a width of an upper base thereof is 1 um to 4 um, for example, 1 um, 1.5 um, 2 um, 2.2 um, 2.7 um, 3 um, 3.4 um, 4 um, or other values, which is not specifically limited in the disclosure.

Figure 10:
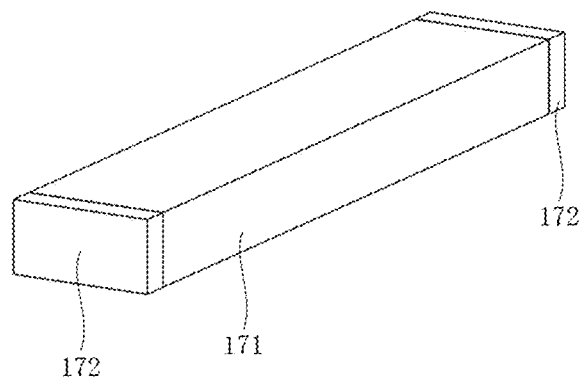
FIG. 10 is a schematic diagram illustrating a second three-dimensional structure of the support member illustrated in FIG. 3.

In embodiments of the disclosure, referring to FIG. 10, FIG. 10 is a schematic diagram of a second three-dimensional structure of the support member illustrated in FIG. 3. The support member 162 of the second structure includes a support body 171 and two hydrophilic layers 172, and the two hydrophilic layers 172 are disposed respectively at two ends of the support body 171 facing the adjacent sealant 163.

It should be understood that the hydrophilic layer 172 facilitates the bonding between the sealant 163 and the support members 162, and makes the sealant 163 and the support members 162 more closely bonded to each other, so as to further enhance the sealing effect.

In other embodiments of the present disclosure, the hydrophilic layer 172 may also be disposed on a surface of the support body 171 which is not connected with the first substrate 110 or the second substrate 120.

In exemplary embodiments, for a detailed description of the support body 171, reference may be made to a related description of the support member 161, and details are not repeatedly described herein.

In exemplary embodiments, the hydrophilic layer 172 may have a contact angle of 5 degrees to 40 degrees, for example, 5 degrees, 8 degrees, 15 degrees, 20 degrees, 26 degrees, 30 degrees, 35 degrees, 40 degrees, or other values, which is not specifically limited in the disclosure.

In exemplary embodiments, the thickness of the hydrophilic layer 172 may be 1 um to 5 um, such as 1 um, 1.2 um, 2 um, 3 um, 3.5 um, 4 um, 4.7 um, 5 um, or other values, which is not specifically limited in the disclosure.

In exemplary embodiments, the hydrophilic layer 172 may be made of sodium silicate (Na2SiO3), sodium tetraborate decahydrate (Na2B4O7·10H2O), sodium hydroxide of calcium oxide hexasiliconate (Na2O·CaO·6SiO2) or sodium carbonate decahydrate (Na2CO3·10H2O), which is not specifically limited in the disclosure.

It should be understood that, the technical solutions corresponding to FIG. 9 and FIG. 10 can be applied to the display panel 100 with the first layer structure and the display panel 200 with the second layer structure.

In summary, the display panel 100 (200) provided herein includes the display region 101 and the non-display region 102 surrounding the periphery of the display region 101. The non-display region 102 includes multiple corner regions 102a and multiple linear regions 102b. The multiple corner regions 102a and the multiple liner regions 102b are arranged alternately and adjacently in sequence. The display panel 100 further includes the first substrate 110, the second substrate 120, the liquid crystal layer 140, and the bezel assembly 160. The first substrate 110 and the second substrate 120 are opposite to and spaced apart from each other. The liquid crystal layer 140 and the bezel assembly 160 are both disposed between the first substrate 110 and the second substrate 120, and the bezel assembly 160 is located on a peripheral of the liquid crystal layer 140. The bezel assembly 160 includes multiple support members 161 and multiple sealant 163. At least one of the multiple support members 161 is disposed in the corner region 102a, the sealant 163 is disposed in the linear region 102b, and the support members 161 and the sealant 163 are both connected between the first substrate 110 and the second substrate 120 to bond the first substrate 110 and the second substrate 120. Two opposite ends of the sealant 130 are respectively connected with one support member 161 in each of two corner regions 120a, and the liquid crystal layer 140 is thus sealed between the first substrate 110 and the second substrate 120. Therefore, by providing the support members 161 in the corner regions 102a to replace the sealant, there is no need to coat the sealant 163 in the corner regions 102a, not only omitting the process of coating the sealant in the corner region, but also preventing the sealant 163 from being coated in the corner region 120a, thereby preventing the sealant 163 from breaking at the corner region 102a due to an excessively fast coating speed and preventing the sealant 163 from broadening at the corner region 102a due to an excessively slow coating speed. Normal display and a narrow bezel design of the display panel 100 (200) are achieved, and the display quality of the display panel 100 (200) is ensured.

Figure 11:
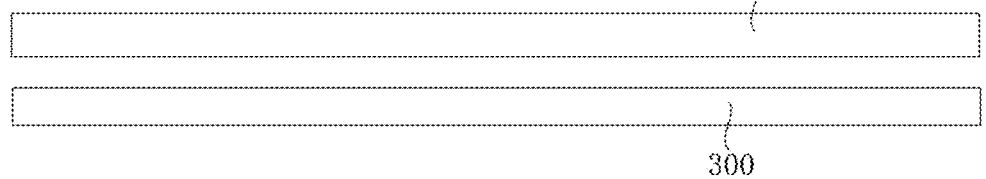
FIG. 11 is a schematic diagram of a layer structure of a display device disclosed in a second embodiment of the disclosure.

Please refer to FIG. 11, FIG. 11 is a schematic diagram illustrating a layer structure of a display device in a second embodiment of the present disclosure. Based on the same inventive concept, the display device 500 provided in embodiments of the disclosure includes a backlight module 300 and the described display panel 100 (200). The display panel 100 (200) is arranged at a light-emitting side of the backlight module 300. The backlight module 300 is configured to provide a backlight source for the display panel 100 (200). The display panel 100 (200) is configured to display an image(s). Since the display panel 100 (200) has been described in detail in the embodiments illustrated in FIG. 1 to FIG. 6, no further description will be given here.

It should be understood that, the display device 500 may be used in an electronic device including, but not limited to, a tablet computer, a notebook computer, a desktop computer, and the like. According to the embodiments of the present invention, the specific type of the display device 500 is not particularly limited, and those skilled in the art can make a corresponding design according to the specific use requirements of applying the display device 500, which will not be repeated here.

In exemplary embodiments, the display device 500 further comprises other necessary components and components such as a driving board, a power board, a high voltage board and a button control board. Those skilled in the art can supplement the display device 500 according to the specific type and actual functions thereof, and the description thereof is omitted here.

In summary, the display device 500 provided herein includes the backlight module 300 and the display panel 100 (200). The display panel 100 (200) includes the display region 101 and the non-display region 102 surrounding the periphery of the display region 101. The non-display region 102 includes multiple corner regions 102a and multiple linear regions 102b. The multiple corner regions 102a and the multiple liner regions 102b are arranged alternately and adjacently in sequence. The display panel 100 further includes the first substrate 110, the second substrate 120, the liquid crystal layer 140, and the bezel assembly 160. The first substrate 110 and the second substrate 120 are opposite to each other. The liquid crystal layer 140 and the bezel assembly 160 are both disposed between the first substrate 110 and the second substrate 120, and the bezel assembly 160 is located on a peripheral of the liquid crystal layer 140. The bezel assembly 160 includes multiple support members 161 and multiple sealant 163. At least one of the multiple support members 161 is disposed in the corner region 102a, the sealant 163 is disposed in the linear region 102b, and the support members 161 and the sealant 163 are both connected between the first substrate 110 and the second substrate 120 to bond the first substrate 110 and the second substrate 120. Two opposite ends of the sealant 130 are respectively connected with one support member 161 in each of two corner regions 120a, and the liquid crystal layer 140 is thus sealed between the first substrate 110 and the second substrate 120. Therefore, by providing the support members 161 in the corner regions 102a to replace the sealant, there is no need to coat the sealant 163 in the corner regions 102a, not only omitting the process of coating the sealant in the corner region, but also preventing the sealant 163 from being coated in the corner region 120a, thereby preventing the sealant 163 from breaking at the corner region 102a due to an excessively fast coating speed and preventing the sealant 163 from broadening at the corner region 102a due to an excessively slow coating speed. Normal display and a narrow bezel design of the display panel 100 (200) are achieved, and the display quality of the display panel 100 (200) is ensured.

Reference throughout this description to "an embodiment", "some embodiments", "an illustrative embodiment", "an example", "a specific example", or "some examples" means that a particular feature, structure, material, or characteristic described in connection with the embodiment or example is included in at least one embodiment or example of the present disclosure. Thus, the appearances of the phrases in various places throughout this description are not necessarily referring to the same embodiment or example of the present disclosure. Furthermore, the particular features, structures, materials, or characteristics may be combined in any suitable manner in one or more embodiments or examples.

It should be understood that the application of the disclosure is not limited to the above examples, and those skilled in the art can make improvements or modifications according to the above descriptions, and all these improvements and modifications shall belong to the scope of protection of the appended claims of the disclosure. Persons of ordinary skill in the art should understand that all or a part of the methods in the foregoing embodiments may also be implemented according to the present invention, and all or a part of the methods in the foregoing embodiments may also be implemented according to the present invention.

What is claimed is:

1. A display panel, comprising a display region and a non-display region surrounding a periphery of the display region, wherein the non-display region comprises a plurality of corner regions and a plurality of linear regions, and the plurality of corner regions and the plurality of linear regions are arranged alternately and adjacently, the display panel further comprising:
   a first substrate and a second substrate opposite to and spaced apart from the first substrate;
   a liquid crystal layer and a bezel assembly both disposed between the first substrate and the second substrate, and the bezel assembly being located on a peripheral of the liquid crystal layer, the bezel assembly comprising a plurality of support members and a plurality of sealant, each corner region being provides with a plurality of support members which are connected and arranged side by side, the sealant being disposed in the linear region, and the support members and the sealant bonding the first substrate and the second substrate, two opposite ends of the sealant being respectively connected with one of the support members in two corner regions, and the liquid crystal layer being sealed between the first substrate and the second substrate;

two opposite ends of one of the plurality of support members in the corner region being connected to the sealant in two liner regions respectively, or, two of the plurality of support members in the corner region being connected to the sealant in two liner regions respectively, wherein the support member is provided with a plurality of magnetic elements, the sealant is provided with a plurality of magnetic particles, and the sealant is configured to move towards the support member under an action of a magnetic force between the magnetic elements and the magnetic particles, and wherein the bezel assembly further comprises a plurality of hydrophobic layers, and the sealant covers the hydrophobic layers on the first substrate and/or the second substrate.

2. The display panel of claim 1, wherein the hydrophobic layer is made fluoropolyethylenes, fluorocarbon waxes, polycarbonates, or polyamides.

3. The display panel of claim 1, wherein the support member is formed on the first substrate, and a width and/or a length of the support member decreases in a direction away from the first substrate.

4. The display panel of claim 1, wherein the support member is formed on the second substrate, and the width and/or the length of the support member decreases in a direction away from the second substrate.

5. The display panel of claim 1, wherein the support member comprises a support body and two hydrophilic layers, and the two hydrophilic layers are disposed respectively at two ends of the support body facing the sealant adjacent to the support body.

6. The display panel of claim 5, wherein the hydrophilic layer is made of sodium silicate, sodium tetraborate decahydrate, sodium hexasiliconate calcium oxide hydrate, or sodium carbonate decahydrate.

7. A display device, comprising a backlight module and a display panel, wherein the display panel is disposed on a light-emitting side of the backlight module and comprising a display region and a non-display region surrounding a periphery of the display region, wherein the non-display region comprises a plurality of corner regions and a plurality of linear regions, and the plurality of corner regions and the plurality of linear regions are arranged alternately and adjacently, the display panel further comprising:

a first substrate and a second substrate opposite to and spaced apart from the first substrate;

a liquid crystal layer and a bezel assembly both disposed between the first substrate and the second substrate, and the bezel assembly being located on a peripheral of the liquid crystal layer, the bezel assembly comprising a plurality of support members and a plurality of sealant, each corner region being provides with a plurality of support members which are connected and arranged side by side, the sealant being disposed in the linear region, and the support members and the sealant bonding the first substrate and the second substrate, two opposite ends of the sealant being respectively connected with one of the support members in two corner regions, and the liquid crystal layer being sealed between the first substrate and the second substrate;

two opposite ends of one of the plurality of support members in the corner region being connected to the sealant in two liner regions respectively, or, two of the plurality of support members in the corner region being connected to the sealant in two liner regions respectively, wherein the support member is provided with a plurality of magnetic elements, the sealant is provided with a plurality of magnetic particles, and the sealant is configured to move towards the support member under an action of a magnetic force between the magnetic elements and the magnetic particles, and wherein the bezel assembly further comprises a plurality of hydrophobic layers, and the sealant covers the hydrophobic layers on the first substrate and/or the second substrate.

8. The display device of claim 7, wherein the hydrophobic layer is made fluoropolyethylenes, fluorocarbon waxes, polycarbonates, or polyamides.

9. The display device of claim 7, wherein the support member is formed on the first substrate, and a width and/or a length of the support member decreases in a direction away from the first substrate.

10. The display device of claim 7, wherein the support member is formed on the second substrate, and the width and/or the length of the support member decreases in a direction away from the second substrate.

11. The display device of claim 7, wherein the support member comprises a support body and two hydrophilic layers, and the two hydrophilic layers are disposed respectively at two ends of the support body facing the sealant adjacent to the support body.

12. The display device of claim 11, wherein the hydrophilic layer is made of sodium silicate, sodium tetraborate decahydrate, sodium hexasiliconate calcium oxide hydrate, or sodium carbonate decahydrate.

\* \* \* \* \*